(12) United States Patent
Kaladgi et al.

(10) Patent No.: US 9,848,014 B2
(45) Date of Patent: Dec. 19, 2017

(54) DELEGATED AUTHENTICATION IN AN INTERNET OF THINGS (IOT) NETWORK

(71) Applicant: CA, Inc., New York, NY (US)

(72) Inventors: Jameel Ahmed Kaladgi, Bangalore (IN); Kiran Kumar B. S., Bangalore (IN); Praveen Kumar Thakur, Bangalore (IN)

(73) Assignee: CA, Inc., New York, NY (US)

( * ) Notice: Subject to any disclaimer, the term of this patent is extended or adjusted under 35 U.S.C. 154(b) by 154 days.

(21) Appl. No.: 15/009,337

(22) Filed: Jan. 28, 2016

(65) Prior Publication Data

US 2017/0223048 A1    Aug. 3, 2017

(51) Int. Cl.
*H04L 29/06* (2006.01)
*H04L 9/32* (2006.01)

(52) U.S. Cl.
CPC ........ *H04L 63/1458* (2013.01); *H04L 9/3226* (2013.01); *H04L 63/10* (2013.01); *H04L 63/1416* (2013.01)

(58) Field of Classification Search
CPC ............. H04L 63/1458; H04L 63/1416; H04L 9/3226; H04L 63/10
USPC ................................ 713/150, 152, 153, 155
See application file for complete search history.

(56) References Cited

U.S. PATENT DOCUMENTS

| | | | | |
|---|---|---|---|---|
| 8,171,538 B2 * | 5/2012 | El Husseini | ........ | H04L 63/0281 726/12 |
| 8,489,877 B2 * | 7/2013 | Ivanov | ................. | G06Q 20/383 713/168 |
| 8,695,064 B2 | 4/2014 | Sama et al. | | |

* cited by examiner

*Primary Examiner* — Jahangir Kabir
(74) *Attorney, Agent, or Firm* — Sage Patent Group

(57) ABSTRACT

A method includes performing, by a processor of a network controller of a network: storing device identifications corresponding to respective ones of a plurality of devices connected via the network, respectively, storing an association between a first one and a second one of the plurality of devices, the association being represented as a pairing identification code corresponding to the first and second ones of the plurality of devices, receiving a communication from an intruder device, the communication comprising the device identification corresponding to one of the first and the second ones of the plurality of devices, sending a request to the intruder device to communicate the pairing identification code, and denying access to the network to the intruder device responsive to the intruder device failing to communicate the pairing identification code.

11 Claims, 6 Drawing Sheets

DELEGATED AUTHENTICATION IN AN INTERNET OF THINGS (IOT) NETWORK

BACKGROUND

The present disclosure relates to the Internet of Things (IoT), and, in particular, to methods, systems, and computer program products for authenticating devices in an IoT network.

The Internet of Things (IoT) refers to a network of physical and virtual things having embedded computer systems associated therewith that allow the things to exchange data with other entities, such as a user, operator, manufacturer, technician, analyst, etc. based on the International Telecommunication Union's Global Standards Initiative. The IoT may allow, for example, things to be sensed, monitored, and/or controlled remotely across existing network infrastructure, which may create more opportunities for direct integration between the physical world and computer-based systems, and may result in improved efficiency, accuracy, and economic benefit. Each thing may be uniquely identifiable through its associated embedded computing system and is able to interoperate within the existing Internet infrastructure. Some experts estimate that the IoT will consist of almost 50 billion things by 2020. The things in the IoT can refer to a wide variety of device or object types such as, but not limited to, medical/biological devices, such as heart monitoring implants or biochip transponders in animals, consumer electronic devices and products, such as home appliances, home HVAC systems, home audio/video monitoring systems, and automobiles, and industrial electronic devices, such as security devices, manufacturing equipment, and environmental sensors. An imposter in an IoT network, however, may copy the identity of a trusted device in an attempt to join the IoT network for potentially nefarious purposes. Such an imposter device may be called a rogue device or intruder device.

SUMMARY

In some embodiments of the inventive subject matter, a method comprises performing, by a processor of a network controller of a network: storing device identifications corresponding to respective ones of a plurality of devices connected via the network, respectively; storing an association between a first one and a second one of the plurality of devices, the association being represented as a pairing identification code corresponding to the first and second ones of the plurality of devices; receiving a communication from an intruder device, the communication comprising the device identification corresponding to one of the first and the second ones of the plurality of devices; sending a request to the intruder device to communicate the pairing identification code; and denying access to the network to the intruder device responsive to the intruder device failing to communicate the pairing identification code.

In other embodiments of the inventive subject matter, a system comprises a processor of a network controller of a network and a memory coupled to the processor and comprising computer readable program code embodied in the memory that is executable by the processor to perform: storing device identifications corresponding to respective ones of a plurality of devices connected via the network, respectively; storing an association between a first one and a second one of the plurality of devices, the association being represented as a pairing identification code corresponding to the first and second ones of the plurality of devices; receiving a communication from the first one of the plurality of devices, the communication comprising the device identification corresponding to the first one of the plurality of devices; sending a request to the first one of the plurality of devices to communicate the pairing identification code; receiving the pairing identification code from the first one of the plurality of devices; and granting access to the network to the first one of the plurality of devices responsive to receiving the pairing identification code.

In further embodiments of the inventive subject matter, a computer program product comprises a tangible computer readable storage medium comprising computer readable program code embodied in the medium that is executable by a processor of a network controller to perform: maintaining device identifications corresponding to a pair of devices connected via the network, respectively; maintaining an association between a pair of devices connected via the network, the association being represented as a pairing identification code corresponding to the pair of devices; receiving a communication from an intruder device, the communication comprising the device identification corresponding to one of the pair of devices; sending a request to the intruder device to communicate the pairing identification code; denying access to the network to the intruder device responsive to the intruder device failing to communicate the pairing identification code; receiving a communication from the one of the pair of devices, the communication comprising the device identification corresponding to the one of the pair of devices; sending a request to the one of the pair of devices to communicate the pairing identification code; receiving the pairing identification code from the one of the pair of devices; and granting access to the network to the one of the pair of devices responsive to receiving the pairing identification code.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
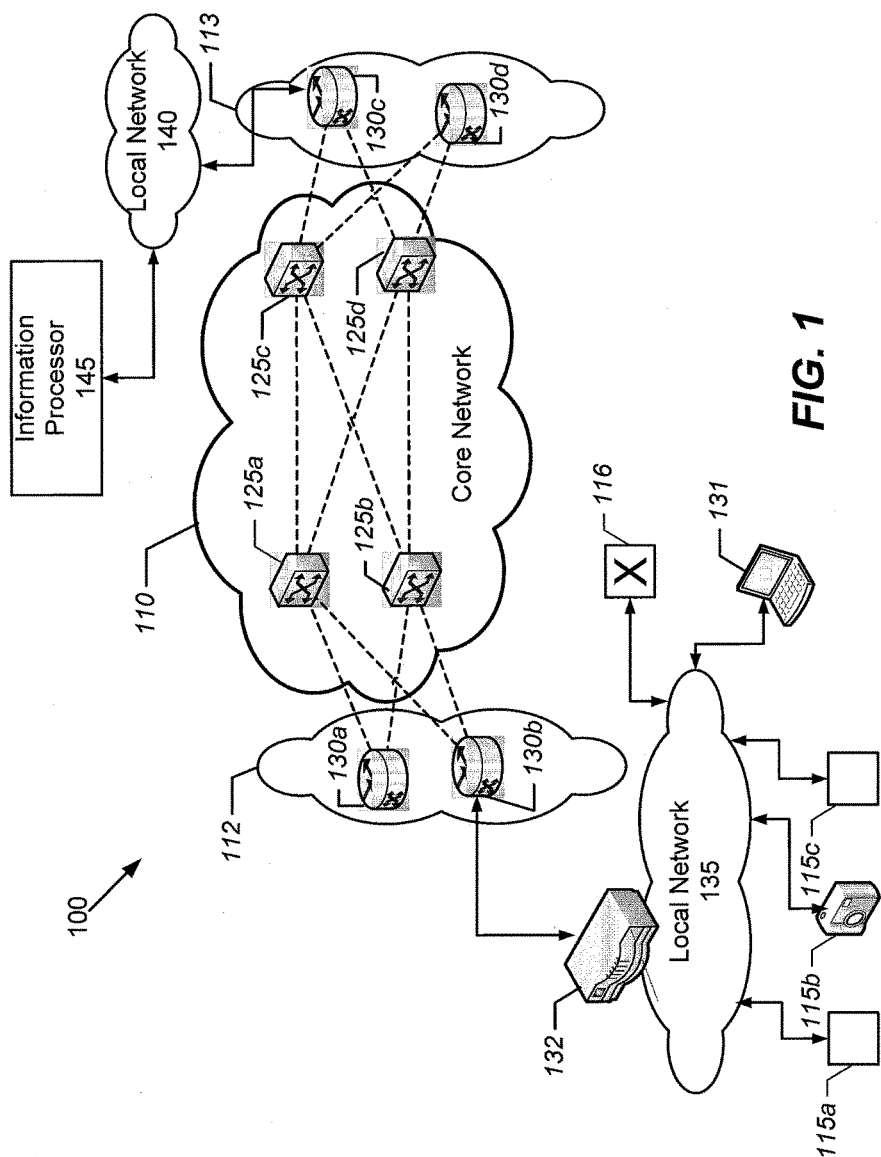
FIG. 1 is a block diagram of a communication network including a network controller for facilitating delegated authentication of devices in an Internet of Things (IoT) network in accordance with some embodiments of the inventive subject matter.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

As used herein, an edge device is a type of network device that connects a first network (e.g., a Local Area Network (LAN)) with a second network (e.g., a Wide Area Network (WAN) or the Internet), where the first and second networks operate under the authority of different entities. Thus, an edge device provides interconnectivity and traffic translation between different networks on their entering edges or the network boundaries.

As used herein, a "thing," when referred to in context to the IoT, is an object of the physical world (physical thing) or an object of the information world (virtual thing), which is capable of being identified and integrated into a communication network. Things have associated information, which can be static and dynamic. A physical thing may be capable of sensing, may be capable of being actuated, and may be capable of being connected. Examples of physical things include, but are not limited to, an electronic sensor, a robot, a good, a product, and a piece of electrical equipment. A virtual thing may be capable of being stored, may be capable of being processed, and may be capable of being accessed. Examples of virtual things include, but are not limited to, multimedia content and application software stored in a memory and executed by a processor.

Some embodiments of the inventive subject matter stem from a realization that things/devices in a network can be paired with one another in a way that the pairing is represented as a pairing identification code. This pairing identification code can be used as a piece of information that the two associated or paired devices have knowledge of and, therefore, have in common. When a rogue or intruder device attempts to impersonate a known device on a network using a valid device identification, the network controller may still be able to detect that the rogue or intruder device is actually an imposter by requiring the rogue or intruder device to provide one or more pairing identification codes representing pairings between the known device the rogue or intruder device is mimicking and other known devices on the network. The rogue or intruder device will be uncovered as a fraudulent and potentially hostile device allowing a network administrator to take protective action to secure the network or potentially take action against the entity associated with the rogue or intruder device. By spreading the range of things/devices a device accessing a network must authenticate with embodiments of the present inventive subject matter may provide a delegated authentication framework that is more secure than authentication schemes relying solely on authentication based on a single factor. The analogy with real time communication between people is as follows: Bob knows Marley, Jim, and Anne. All four people have exchanged their social security numbers with each other. In an attempt to communicate with one or more members of the group, Sam attempts to impersonate Bob by providing Bob's social security number. But an administrator knows that if that really is Bob, then he will also know Marley's, Jim's, and Anne's social security number and, therefore, challenges Sam to provide one or more of Marley's, Jim's, and Anne's social security numbers. Sam will be unable to do so and will be uncovered as an intruder attempting to impersonate Bob.

FIG. 1 is a block diagram of a communication network including a network controller for facilitating delegated authentication of devices in an Internet of Things (IoT) network in accordance with some embodiments of the inventive subject matter. The communication network 100 comprises a core network 110 coupled to a first access network 112 and a second access network 113. The core network 110 is the central part of the communications network 100 and provides various services to customers who are connected by the access networks 112 and 113. The core network 110 comprises switches/routers 125a, 125b, 125c, and 125d that are used to route calls and data traffic between the access networks 112 and 113. Access networks 112 and 113 comprise a part of the communications network 100 that is used to connect customers or subscribers to their immediate service provider. As shown in FIG. 1, access network 112 comprises switches/routers 130a, 130b along with the series of wires, cables, and equipment used to connect customers/subscribers associated with the local network 135. Similarly, access network 113 comprises switches/routers 130c, 130d along with the series of wires, cables, and equipment used to connect customers/subscribers associated with the local network 140. The core network 110, access network 112, and access network 113 may each operate under the authority of the same entity or different entities. For example, the access network 112 and the core network 110 may operate under the authority of a first service provider while the access network 113 may operate under the authority of a second service provider. The local networks 135 and 140 may operate under the authority of different entities than the core network 110, access network 112, and access network 113. For example, the local network 135 may be a private network or Virtual Private Network (VPN) implemented in a residence, small business, enterprise, etc. and may have things 115a, 115b, and 115c connected thereto as part of an IoT. The things 115a, 115b, and 115c may be connected to the local network 135 using wireless and/or wired connections. The local network 140 may be a private network or VPN implemented in an enterprise that uses the information processor 145 to process data generated by things, such as things 115a, 115b, and 115c, in the IoT. The information processor 145 may be connected to the local network 140 using a wireless and/or wired connection. For example, the information processor 145 may be part of a cloud service that a residential customer purchased to process data, such as security data, generated by devices in the customer's home, which are represented as things 115a, 115b, and 115c.

The core network 110, access network 112, and access network 113 may be a global network, such as the Internet or other publicly accessible network. Various elements of the core network 110, access network 112, and access network 113 may be interconnected by a wide area network, a local area network, an Intranet, and/or other private network, which may not be accessible by the general public. Thus, the core network 110, access network 112, and access network 113 may represent a combination of public and private networks or a VPN. The core network 110, access network 112, and access network 113 may be a wireless network, a wireline network, or may be a combination of both wireless and wireline networks.

The local network 135 may comprise a network controller 132 that is used to administer or manage the local network 135. The network controller 132 may act as a gatekeeper in granting or denying access to devices on the local network 135 and, in some embodiments, may act as a gateway in blocking or allowing communications exiting the local network 135 and destined for other networks as well as communications originating on other networks and destined to enter the local network 135. An administrator of the network 135 may use a computer 131 to interface with the network controller 132 to manage the network 135. For example, when a new device is added to the local network, such as device 115a, the administrator may communicate with both the network controller 132 and the new device 115a to register a device identification for the device 115a with the network controller as well as assist in pairing the new device 115a with other known devices on the local network 135, such as devices 115b and 115c. A rogue or intruder device 116, however, may attempt to gain access to the local network 135 by impersonating one or more of the known devices 115a, 115b, and 115c by using the device identification corresponding to a known device. Because the rogue or intruder device 116 may have harmful intentions for seeking access to the local network 135, the network controller 132 may deny access to the local network 135 to the rogue or intruder device 116 by challenging the rogue or intruder device 116 to provide one or more pairing identification code(s) corresponding to pairing associations between the device the rogue or intruder device 116 is impersonating and other devices on the local network 135. Thus, even if the rogue or intruder device 116 is able to obtain an identification for a known device on the local network 135, the rogue or intruder device 116 may not be able to obtain one or more pairing identification codes representing relationships associations between the impersonated device and other known devices on the local network 135. Thus, the network controller may deny the rogue or intruder device 116 access to the local network 135, which may potentially protect the local network 135 and devices connected thereto from harm that could be carried out through the rogue or intruder device 116.

Although FIG. 1 illustrates a system for using a network controller to facilitate delegated authentication of devices in an IoT network in accordance with some embodiments of the inventive subject matter, it will be understood that embodiments of the present invention are not limited to such configurations, but are intended to encompass any configuration capable of carrying out the operations described herein.

Figure 2:
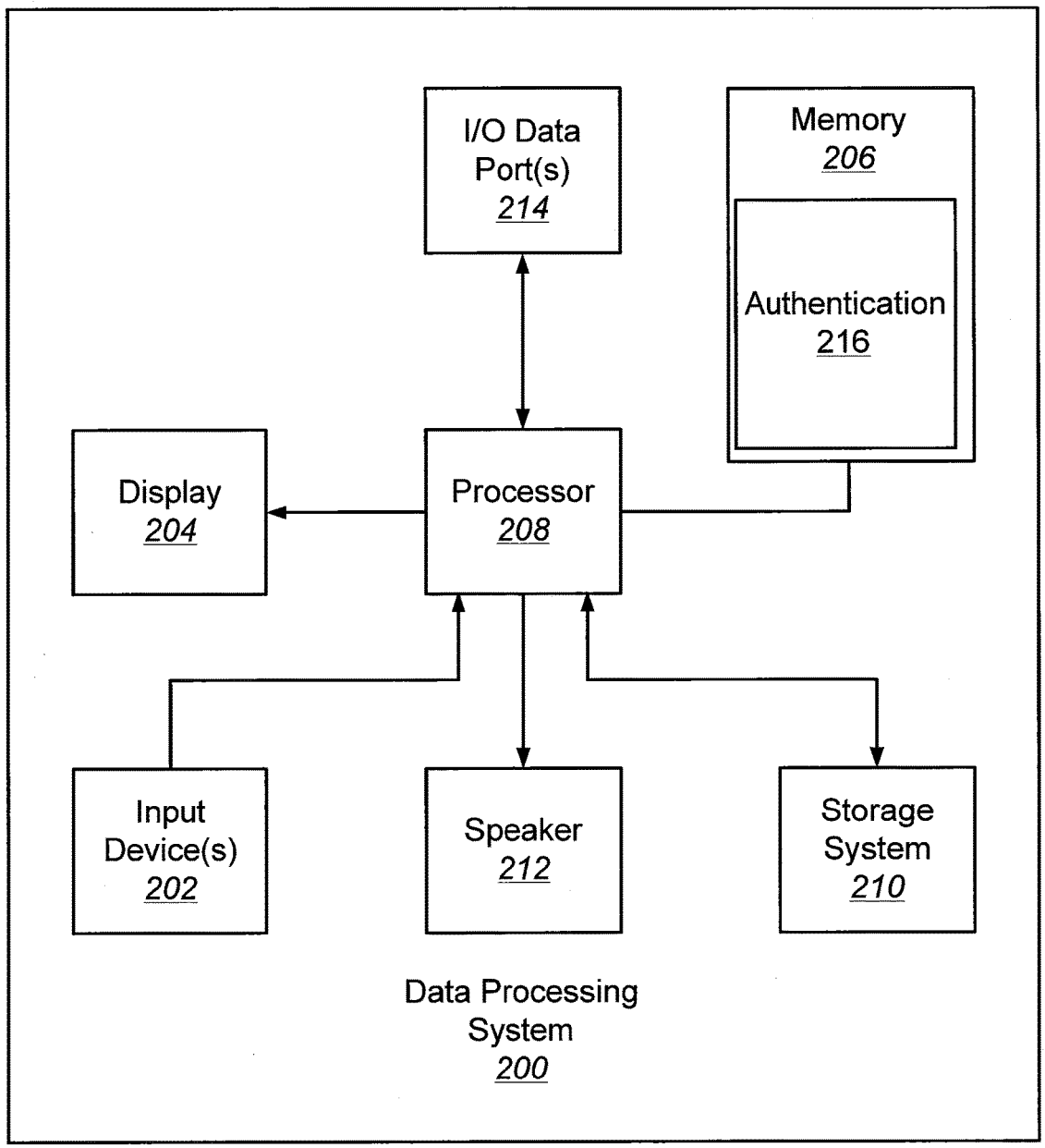
FIG. 2 illustrates a data processing system that may be used to implement the network controller of FIG. 1 in accordance with some embodiments of the inventive subject matter.

Referring now to FIG. 2, a data processing system 200 that may be used to implement the network controller 132 of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with an authentication module 216 that may provide functionality that may include, but is not limited to, facilitating the delegated authentication of devices in an IoT network.

Figure 3:
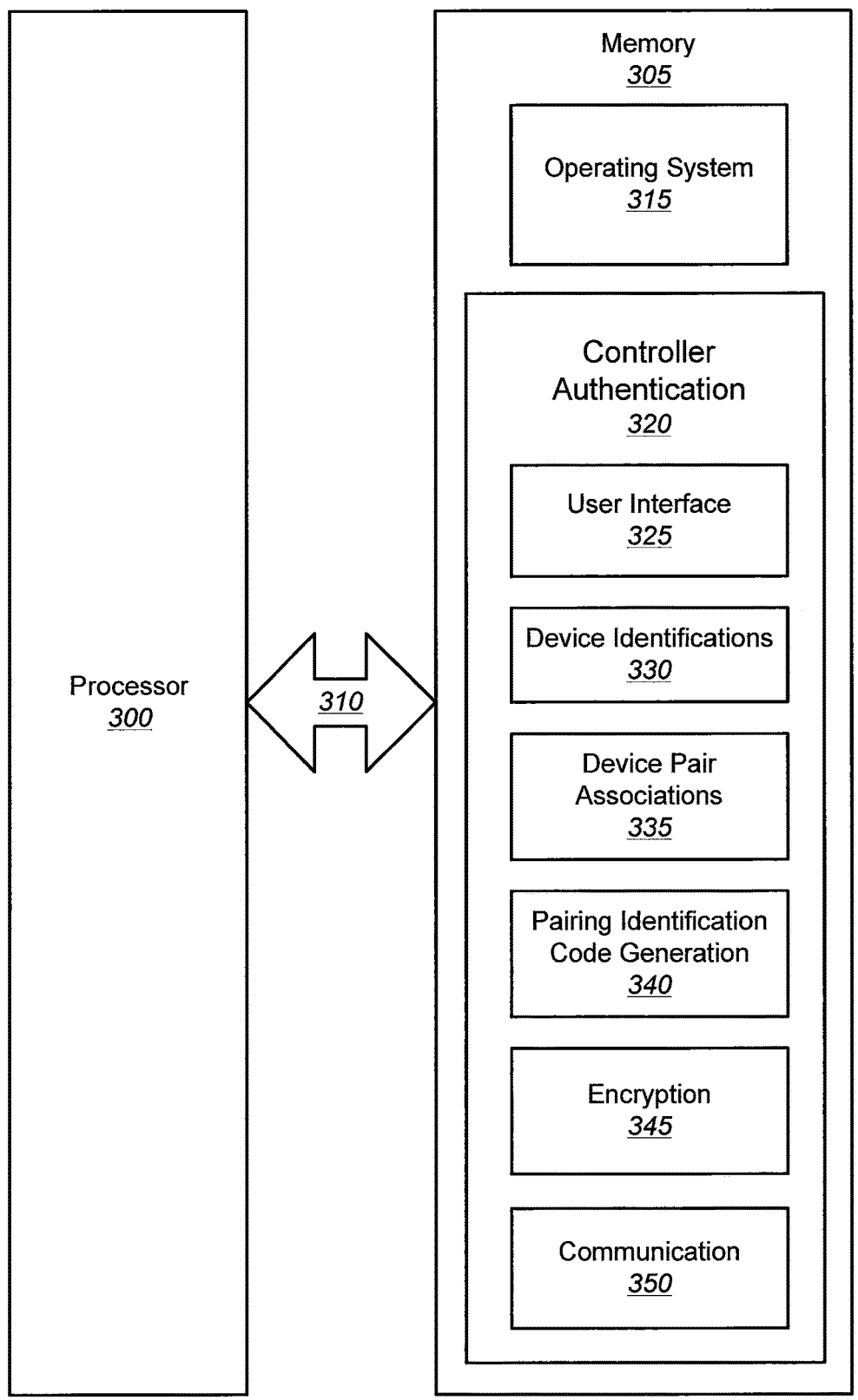
FIG. 3 is a block diagram that illustrates a software/hardware architecture for use in a network controller for facilitating delegated authentication in an IoT network in accordance with some embodiments of the inventive subject matter.

FIG. 3 illustrates a processor 300 and memory 305 that may be used in embodiments of data processing systems, such as the network controller 132 of FIG. 1 and the data processing system 200 of FIG. 2, respectively, for facilitating delegated authentication of devices in an IoT network in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for facilitating delegated authentication of devices in an IoT network in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain two or more categories of software and/or data: an operating system 315 and a controller authentication module 320. In particular, the operating system 315 may manage the data processing system's software and/or hardware resources and may coordinate execution of programs by the processor 300. The controller authentication module 320 may comprise a user interface module 325, a device identifications module 330, a device pair associations module 335, a pairing identification code generation module 340, an encryption module 345, and a communication module 350. The user interface module 325 may be configured to provide an interface between the network controller 132 and an administrator's computing device 131, such as a laptop computer, desktop computer, tablet, smart phone and the like to allow the user to manage the local network 135 and facilitate setting up new things, e.g., devices, on the local network 135.

The device identifications module 330 may be configured to maintain the device identifications obtained from new things/devices 115a, 115b, 115c when an administrator sets them up on the network 135. In accordance with various embodiments of the inventive subject matter, a device identification may include, but is not limited to, a media access control (MAC) address, an identification coded or burnt into the device hardware, and a device signature, which is generated based on a device characteristic that is dependent on manufacturing process variations. Examples of device identifications are described, for example, in U.S. Pat. No. 8,695,064 the disclosure of which is hereby incorporated herein by reference.

The device pair associations module 335 may be configured to maintain associations between pairs of things/devices 115a, 115b, 115c on the local network 135. For example, if all devices pair with every other device on the local network 135, then the device pair associations module 335 may include a list of all possible pairings for all the devices on the local network 135. In some embodiments, the controller 132 may not pair a device with all devices on the local network 135. Thus, the device pair associations module 335 may keep track of which things/devices 115a, 115b, 115c on the local network 135 have pairing associations.

The pairing identification code generation module 340 may be configured to maintain and/or generate pairing identification codes representing the pairing associations between the various things/devices 115a, 115b, 115c on the local network 135. In some embodiments, the pairing identification code generation module 340 may receive codes, such as random codes, from the things/devices 115a, 115b, 115c when they are first setup on the local network 135. These codes may then be combined, such as through concatenation or another type of logical combination, to generate a pairing identification code. The pairing is symmetrical such that if a first thing/device is associated or paired with a second thing/device, then the second thing/device is also associated or paired with the first thing/device. Thus, the pairing identification code for device 1 and device 2 may be "random1random2" where random 1 is a random code corresponding to device 1 and random 2 is a random code corresponding to device 2. In other embodiments, the pairing identification code may be generated by using a hash function to hash a combination of the device identifications for the respective devices. The pairing identification code generation module 340 may then communicate the pairing association to the two paired things/devices for storage thereon. The pairing identification code generation module 340 may also, in some embodiments, store the generated pairing identification codes locally on the network controller 132. In other embodiments, the pairing identification code generation module 340 may generate the codes for each new thing/device 115a, 115b, 115c on the network controller 132 and then combine the two codes as described above to create the pairing identification code. The codes for each new device may be generated through a random code generator or the like similar to the way the codes may be generated locally at the things/devices 115a, 115b, 115c.

The encryption module 345 may provide encryption and decryption services for the network controller 132. In some embodiments, the pairing identification code generation module may encrypt the pairing identification codes before they are sent out to the individual things/devices 115a, 115b, 115c. Moreover, the devices may encrypt the codes sent to the pairing identification code generation module 340 on the network controller 132 when sending those codes to be used in generating the pairing identification codes. These encrypted codes received at the network controller 132 may be decrypted before the pairing identification code generation module 340 combines them to form a pairing identification code. In accordance with various embodiments of the inventive subject matter, the encryption module 345 may use public key encryption, symmetric key encryption, a substitution cipher, a transposition cipher, and/or a block cipher. The encryption technique used may vary based on the level of security desired, processing power at the network controller 132 and/or the things/devices 115a, 115b, and 115c, a desired speed in encrypting and decrypting the information, and the like.

The communication module 350 may be configured to facilitate communication between the network controller 132 and other entities, such as the things/devices 115a, 115b, and 115c and the administrator's computer 131.

Although FIG. 3 illustrates hardware/software architectures that may be used in data processing systems, such as the network controller 132 of FIG. 1 and the data processing system 200 of FIG. 2, respectively, for facilitating delegated authentication of devices in an IoT network in accordance with some embodiments of the inventive subject matter, it will be understood that the present invention is not limited to such a configuration but is intended to encompass any configuration capable of carrying out operations described herein.

Figure 4:
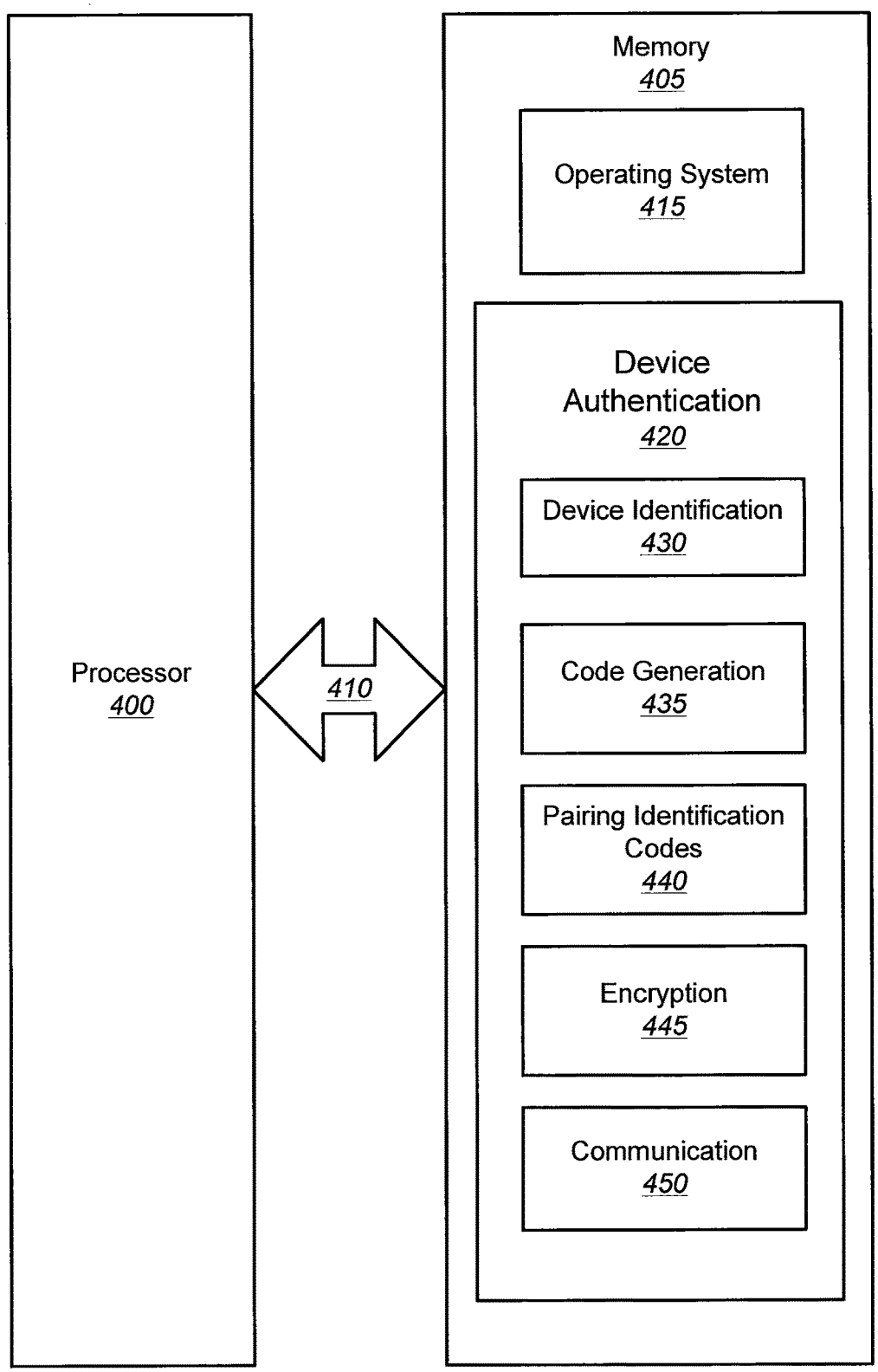
FIG. 4 is a block diagram that illustrates a software/hardware architecture for use in a network device to facilitate delegated authentication in an IoT network in accordance with some embodiments of the inventive subject matter.

FIG. 4 illustrates a processor 400 and memory 405 that may be used in embodiments of data processing systems, such as the things/devices 115a, 115b, 115c of FIG. 1 for facilitating delegated authentication of devices in an IoT network in accordance with some embodiments of the inventive subject matter. The processor 400 communicates with the memory 405 via an address/data bus 410. The processor 400 may be, for example, a commercially available or custom microprocessor. The memory 405 is representative of the one or more memory devices containing the software and data used for facilitating delegated authentication of devices in an IoT network in accordance with some embodiments of the inventive subject matter. The memory 405 may include, but is not limited to, the following types of devices: cache, ROM, PROM, EPROM, EEPROM, flash, SRAM, and DRAM.

As shown in FIG. 4, the memory 405 may contain two or more categories of software and/or data: an operating system 415 and a device authentication module 420. In particular, the operating system 415 may manage the data processing system's software and/or hardware resources and may coordinate execution of programs by the processor 400. The device authentication module 420 may comprise a device identification module 430, a pairing identification codes module 440, an encryption module 445, and a communication module 450.

The device identification module 430 may be configured to provide a device identification to the controller 132 when the thing/device is setup on the local network 135. As described above with respect to the device identifications module 330, in accordance with various embodiments of the inventive subject matter, a device identification may include, but is not limited to, a media access control (MAC) address, an identification coded or burnt into the device hardware, and a device signature, which is generated based on a device characteristic that is dependent on manufacturing process variations. Example device identifications are described, for example, in U.S. Pat. No. 8,695,064 the disclosure of which is hereby incorporated herein by reference.

The code generation module 435 may be configured to generate a code that can be used by the pairing identification code generation module 340 on the network controller 132 to generate pairing identification codes for the device with other things/devices on the local network 135. The code may be generated through, for example, a random code generator. As described above, in some embodiments, the network controller may generate the code for the device, which is used in creating pairing identification codes for the device and other things/devices associated with the device, i.e., paired with the device. In this case, the code generation module 435 may not be used on the thing/device 115a, 115b, 115c.

The pairing identification codes module 440 may be configured to maintain and store the pairing identification codes for the each other thing/device on the local network 135 that the device is associated with, i.e., has been paired with. These pairing identification codes are received from the network controller 132.

The encryption module 445 may provide encryption and decryption services for the device/thing 115a, 115b, 115c. In some embodiments, the pairing identification code generation module may encrypt the pairing identification codes before they are sent out to the individual things/devices 115a, 115b, 115c. As a result, the pairing identification codes may be decrypted on the things/devices 115a, 115b, 115c when they are received. Moreover, the things/devices 115a, 115b, 115c may encrypt the codes sent to the pairing identification code generation module 340 on the network controller 132 when sending those codes to be used in generating the pairing identification codes. As described above, in accordance with various embodiments of the inventive subject matter, the encryption module 445 may use public key encryption, symmetric key encryption, a substitution cipher, a transposition cipher, and/or a block cipher. The encryption technique used may vary based on the level of security desired, processing power at the network controller 132 and/or the things/devices 115a, 115b, and 115c, a desired speed in encrypting and decrypting the information, and the like.

The communication module 450 may be configured to facilitate communication between the things/devices 115a, 115b, and 115c and also other entities, such as the network controller 132, the administrator computer 131.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the network controller 132 of FIG. 1, the data processing system 200 of FIG. 2, and the hardware/software architectures of FIGS. 3 and 4, may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 1-4 may be used to facilitate delegated authentication in an IoT network according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 206 coupled to the processor 208, the memory 305 coupled to the processor 300, and the memory 405 coupled to the processor 400 include computer readable program code that, when executed by the respective processors, causes the respective processors to perform operations including one or more of the operations described herein with respect to FIGS. 5 and 6.

Figure 5:
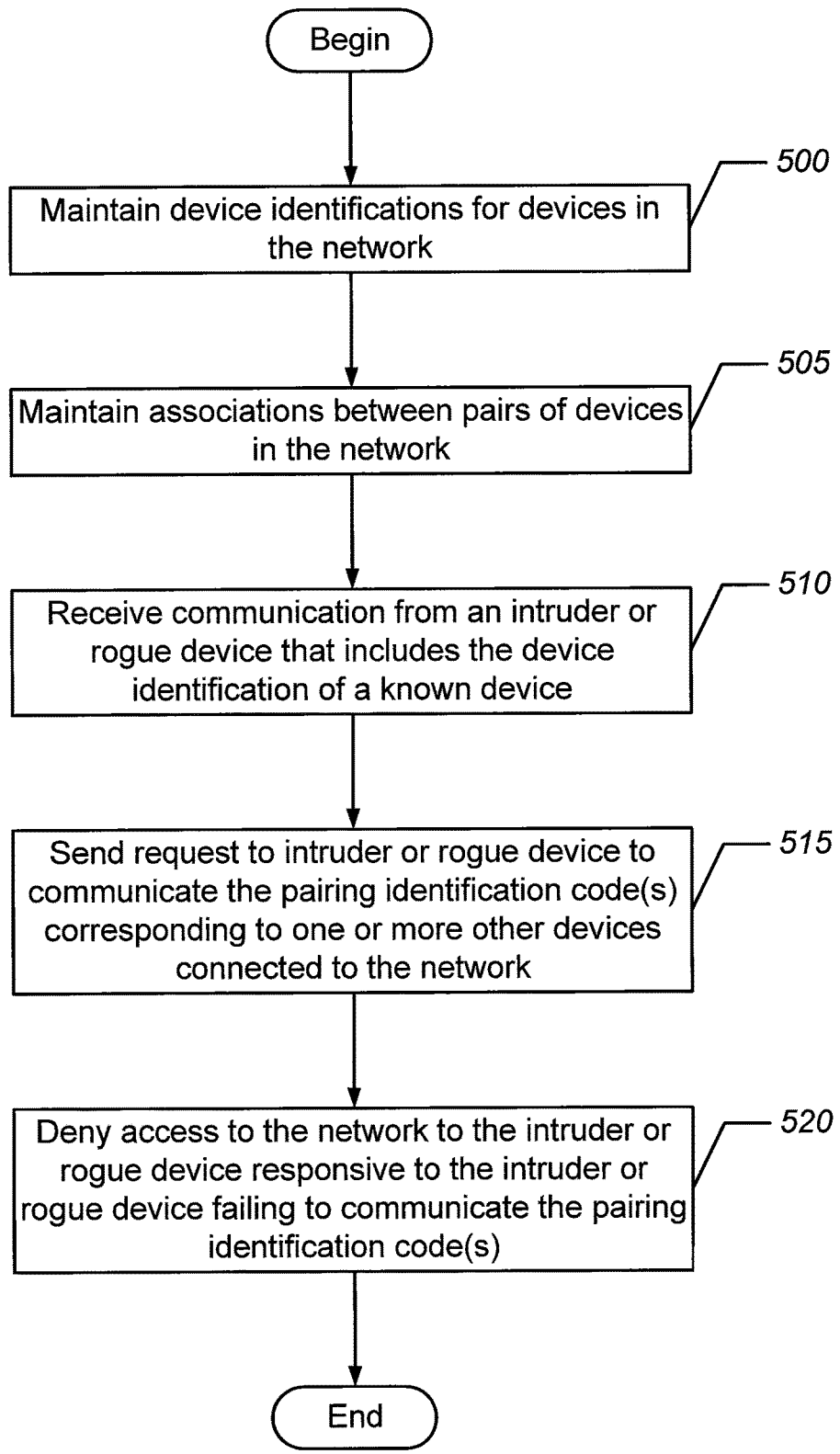
FIGS. 5 and 6 are flowcharts that illustrate operations of a network controller for facilitating delegated authentication of devices in an IoT network in accordance with some embodiments of the inventive subject matter.
Figure 6:
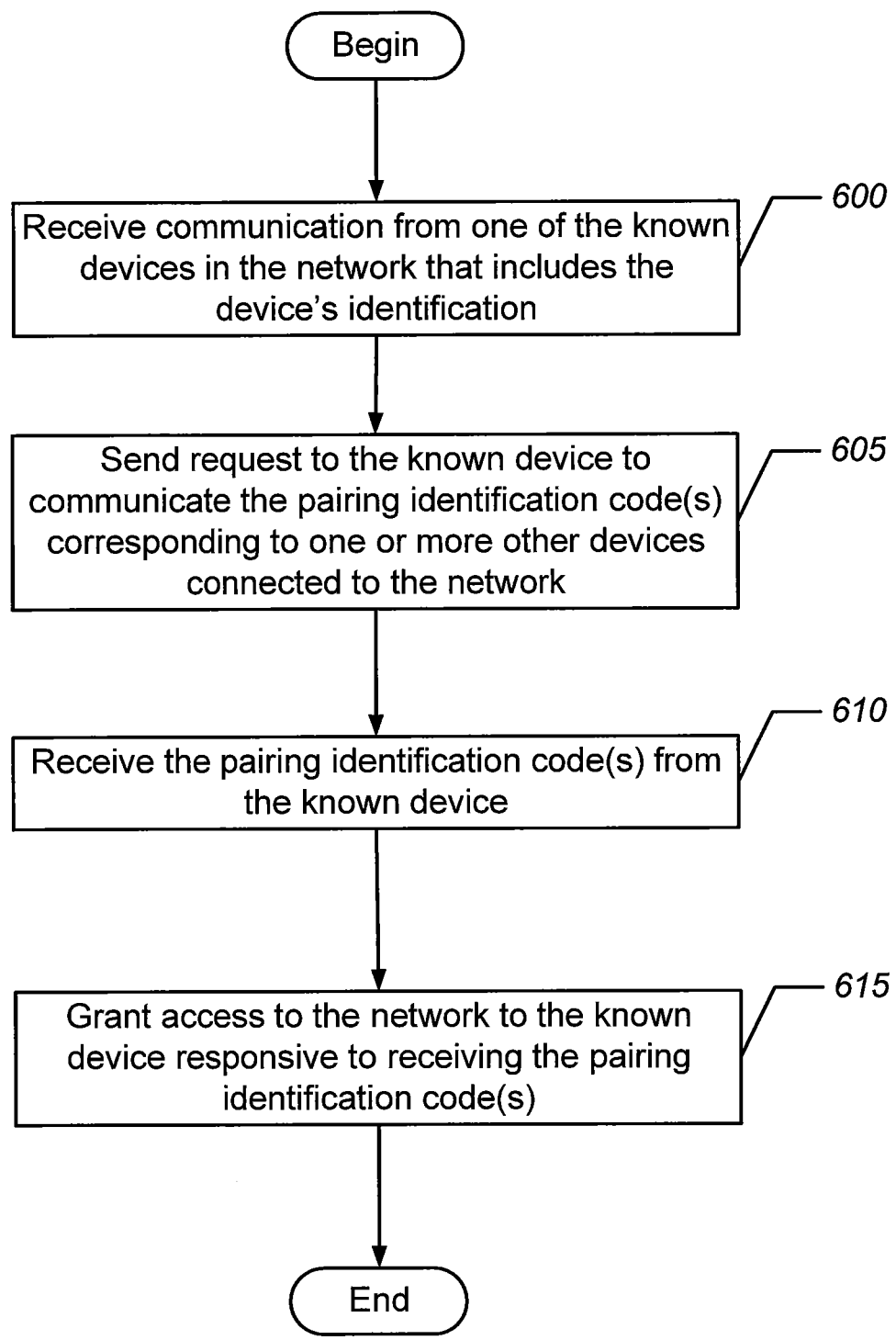

FIGS. 5 and 6 are flowcharts that illustrate operations of a network controller for facilitating delegated authentication in an IoT network in accordance with some embodiments of the inventive subject matter. Referring now to FIG. 5, operations begin at block 500 where the device identifications module 330 on the network controller 132 maintains the device identifications for the things/devices 115a, 115b, 115c in the network 135. At block 505, the device pair associations module 335 maintains the associations between the pairs of things/devices 115a, 115b, 115c. For example, a list may be maintained that indicates that device 115a has paired with devices 115b and 115c, but device 115b has not paired with device 115c. As described above, in other embodiments, all devices on the network may pair with each other. Furthermore, as described above, an association between two things/devices 115a, 115b, 115c, i.e., a pairing, is represented via a pairing identification code. A rogue or intruder device 116 may, however, obtain the device identification for one of the known things/devices 115a, 115b, 115c and use this identification as part of a communication received at block 510 by the network controller 132 in an attempt to access the local network 135. The network controller 132, however, has information regarding which thing(s)/device(s) that the rogue or intruder device 116 is posing as associated or paired with. As a result, at block 515, the network controller 132 may challenge the rogue or intruder device 116 with a request at block 515 to provide one or more pairing identification codes corresponding to the various things/devices that the thing/device that the rogue or intruder device is impersonating is associated or paired with. For example, if the rogue or intruder device is posing as known device 115a and device 115a is associated or paired with devices 115b and 115c, then the network controller 132 may request that the rogue or intruder device communicate the pairing identifications codes between devices 115a and 115b and between 115a and 115c. The more pairing identification codes requested, the greater the security. In some embodiments, the network controller may request a single pairing identification code corresponding to a single association even if the rogue or intruder device 116 is posing as a known device that has multiple associations or pairings. When the rogue or intruder device 116 is unable to reply with the requested pairing identification code(s) at block 520, then the network controller 132 denies access to the communication network to the rogue or intruder device 116. The rogue or intruder device may reply with some type of response attempting to match the one or more pairing identification codes that were requested. In this case, the network controller 132 may compare the response from the rogue or intruder device 116 to the pairing identification codes stored locally on the network controller 132 or, when the pairing identification codes are not stored locally, may poll the appropriate things/devices 115a, 115b, 115c to respond with their pairing identification codes corresponding to the thing/device that the rogue or intruder device 116 is mimicking. For example, if the rogue or intruder device 116 is posing as known device 115a, then the network controller may poll devices 115b and 115c for their pairing identification codes with device 115a.

Referring now to FIG. 6, operations of the network controller 132 when a known thing/device 115a, 115b, 115c attempts to access the local network 135, according to some embodiments of the inventive subject matter, will now be described. Operations begin at block 600 where the network controller 132 receives a communication from one of the known things/devices 115a, 115b, 115c in an attempt to access the local network 135. The network controller 132 may challenge the known thing/device with a request at block 605 to provide one or more pairing identification codes corresponding to the various things/devices that the thing/device is associated or paired with. For example, if the communication is received from known device 115a and device 115a is associated or paired with devices 115b and 115c, then the network controller 132 may request that device 115a communicate the pairing identifications codes between devices 115a and 115b and between 115a and 115c. Because the known device 115a has those pairing identification codes stored in the pairing identification codes module 440 when they were received from the network controller 132 when the device 115a was set up on the local network 135 or the other things/devices 115b and 115c were set up on the local network 135, the network controller 132 receives the requested pairing identification codes at block 610 and grants access to the local network 135 to the known thing/device at block 615. As described with respect to FIG. 5, the network controller 132 may compare the response from the known thing/device to the pairing identification codes stored locally on the network controller 132 or, when the pairing identification codes are not stored locally, may poll the appropriate things/devices 115a, 115b, 115c to respond with their pairing identification codes corresponding to the thing/device that the rogue or intruder device 116 is mimicking.

For example, if the pairing identification codes are received from known device 115a, then the network controller may poll devices 115b and 115c for their pairing identification codes with device 115a. In some embodiments, when the network controller needs to poll the known things/devices 115a, 115b, 115c for the pairing identification codes, not all of the known devices may be active or working properly and may not be able to respond. In this case or in other circumstances according to some embodiments of the inventive subject matter, the network controller may only require that the device attempting to access the local network 135 be able to provide a number of matching pairing identification codes that meets or exceeds some threshold number. The threshold could be a single pairing identification code or may, for example, be 75% of the number of pairing identification codes that the thing/device seeking access to the local network 135 should be able to provide.

Some embodiments of the inventive subject matter provide a network controller that can manage pairings between known devices on a network to provide a delegated authentication system in which rogue or intruder devices that successfully obtain valid device identifications for known devices on the network may still be denied access when they are unable to produce pairing identification codes, which represent the relationships between the devices the rogue or intruder devices are mimicking and other known devices on the network.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
performing, by a processor of a network controller of a network:
storing device identifications corresponding to two or more of a plurality of devices connected using the network forming a core network of trusted devices to allow access between devices and to share information between the trusted devices;
storing an association between a first device and a second device of the plurality of devices, the association being represented as a pairing identification code corresponding to the first and second devices of the plurality of devices;
encrypting the pairing identification code;

transmitting the encrypted pairing identification code to each of the first and second devices;

receiving a communication from a requesting device to access the core network, the communication comprising a device identification corresponding to one of the first and the second devices;

sending a request to the requesting device to transmit the pairing identification code; and in response to determining that, received pairing identification code matches the stored pairing identification code, further determining that the requesting device is one of the first and the second devices, and granting the requesting device access to the core network;

in response to determining that, no pairing identification code is received or the received pairing identification code does not match the stored pairing identification code, further determining that the requesting device is an intruder device, and denying the intruder device access to the core network.

2. The method of claim 1, wherein the device identifications comprise media access control (MAC) addresses corresponding to respective devices of the plurality of devices.

3. The method of claim 1, wherein the device identifications comprise device signatures, respectively, which are generated based on a device characteristic that is dependent on manufacturing process variations.

4. The method of claim 1, further comprising:
receiving a first code from the first device of the plurality of devices;
receiving a second code from the second device of the plurality of devices;
generating the pairing identification code based on the first code and the second code,
wherein the encrypting is performed on the pairing identification code that is generated.

5. The method of claim 4, wherein the first code is an encrypted first code, the second code is an encrypted second code, the method further comprising:
decrypting the encrypted first code and the encrypted second code to generate a decrypted first code and a decrypted second code; and
wherein generating the pairing identification code comprises generating the pairing identification code based on the decrypted first code and the decrypted second code.

6. The method of claim 1, further comprising:
generating a first code corresponding to the first device of the plurality of devices;
generating a second code corresponding to the second device of the plurality of devices; and
generating the pairing identification code based on the first code and the second code,
wherein the encrypting is performed on the pairing identification code that is generated.

7. The method of claim 1, wherein storing the association comprises storing a plurality of associations between pairs of the plurality of devices connected using the network, the plurality of associations being represented by a plurality of pairing identification codes corresponding to the pairs of the plurality of devices, respectively;
wherein sending the request to the requesting device comprises sending the request to the first device of the plurality of devices to communicate multiple pairing identification codes;
wherein receiving the pairing identification code comprises receiving the multiple pairing identification codes from the first device of the plurality of devices; and
wherein granting the requesting device access to the core network comprises granting access to the core network to the first device of the plurality of devices responsive to receiving the multiple pairing identification codes.

8. The method of claim 7, wherein sending the request to the requesting device comprises sending the request to the requesting device to communicate the multiple pairing identification codes; and
wherein denying the intruder device access to the core network comprises denying access responsive to the intruder device failing to communicate the multiple pairing identification codes.

9. The method of claim 7, further comprising:
sending a request to a devices of the plurality of devices other than the first device of the plurality of devices to communicate pairing identification codes with the first device of the plurality of devices, respectively;
receiving a portion of the multiple pairing identification codes of the plurality of pairing identification codes from the device other than the first device of the plurality of devices responsive to the request to communicate the pairing identification codes with the first device of the plurality of devices;
determining whether a number of the portion of the multiple pairing identification codes of the plurality of pairing identification codes that matches the multiple pairing identification codes of the pairing identification codes received from the first device of the plurality of devices exceeds a threshold; and
wherein granting access to the core network comprises granting access to the network to the first device of the plurality of devices responsive to determining that the number of the portion of the multiple pairing identification codes of the plurality of pairing identification codes exceeds the threshold.

10. A system, comprising:
a processor of a network controller of a network; and
a memory coupled to the processor and comprising computer readable program code embodied in the memory that is executable by the processor to perform:
storing device identifications corresponding to two or more of a plurality of devices connected using the network forming a core network of trusted devices to allow access between devices and to share information between the trusted devices;
storing an association between a first device and a second device of the plurality of devices, the association being represented as a pairing identification code corresponding to the first and second devices of the plurality of devices;
encrypting the pairing identification code;
transmitting the encrypted pairing identification code to each of the first and second devices;
receiving a communication from a requesting device to access the core network, the communication comprising a device identification corresponding to one of the first and the second devices;
sending a request to the requesting device to transmit the pairing identification code; and
in response to determining that, received pairing identification code matches the stored pairing identification code, further determining that the requesting device is one of the first and the second devices, and granting the requesting device access to the core network;

in response to the determining that, no pairing identification code is received or the received pairing identification code does not match the stored pairing identification code, further determining that the requesting, device is an intruder device, and denying the intruder device access to the core network.

11. A computer program product, comprising:

a non-transitory computer readable storage medium comprising computer readable program code embodied in the medium that is executable by a processor of a network controller to perform:

store device identifications corresponding to two or more of a plurality of devices connected using the network forming a core network of trusted devices to allow access between devices and to share information between the trusted devices;

storing an association between a first device and a second device of the plurality of devices, the association being represented as a pairing identification code corresponding to the first and second devices of the plurality of devices;

encrypting the pairing identification code;

transmitting the encrypted pairing identification code to each of the first and second devices;

receiving a communication from a requesting device to access the core network, the communication comprising a device identification corresponding to one of the first and the second devices;

sending a request to the requesting device to transmit the pairing identification code; and in response to determining that, received pairing identification code matches the stored pairing identification code, further determining that the requesting device is one of the first and the second devices, and granting the requesting device access to the core network;

in response to determining that, no pairing identification code is received or the received pairing identification code does not match the stored pairing identification code, further determining that the requesting device is an intruder device, and denying the intruder device access to the core network.

* * * * *